June 19, 1951  E. A. CHANDLER  2,557,727
THERMOCONTROL ARRANGEMENTS FOR ELECTRIC CIRCUITS
Filed May 19, 1947

Inventor
E. A. Chandler

Patented June 19, 1951

2,557,727

UNITED STATES PATENT OFFICE 2,557,727

THERMOCONTROL ARRANGEMENT FOR ELECTRIC CIRCUITS

Edward Anthony Chandler, London, England, assignor to Molins Machine Company Limited, London, England, a British company Application May 19, 1947, Serial No. 749,048 In Great Britain May 20, 1946

5 Claims. (Cl. 175—375)

1

This invention concerns improvements in or relating to thermo-control arrangements for electric circuits and more particularly arrangements comprising a heat responsive switching device or thermostat, for example a mercury contact thermometer or a bimetallic strip.

The invention is primarily directed to the control of circuits comprising electric heaters although it is applicable for the control of any other electric circuit providing that sufficient heat is generated in any manner in or near a part of the circuit to operate the heat responsive switching device.

In many kinds of machines there are provided electric heating elements and often it is necessary to maintain the part of the machine where the heaters are located at substantially uniform temperatures. In for example automatic packing machines the adhesive used is most commonly dried by electric heaters and often close control of the heat is essential to prevent spoiling the contents of the packets. During the working of such a machine the temperature of the heated parts is likely to vary for several reasons. For instance, if the machine stops, the temperature may increase since packets are not passing the heaters, and when the machine is running the movement of the machine parts gives rise to cooling currents of air and so on. The control of the heat therefore necessitates some form of thermostat control and an object of the invention is to arrange this so that the thermostat will have a long useful life. In the specific embodiment of the invention to be given later a mercury thermometer with electric contacts fused into the glass is used for reasons given in the description and the arcing due to the making and breaking of the circuit causes the contacts to corrode or decay.

A mercury contact thermometer suffers from the disadvantage that only low current values suitable only for delicate relays can be broken successfully and unless a slugged relay is used, chatter occurs due to the uncertain and slow break of the mercury arc. If, however, a slugged relay is used it is necessary to employ a surge absorber to prevent excessive arcing between the mercury and a contact just emerging from contact therewith. With the construction according to the invention it is possible to employ a substantial relay and avoid the use of the surge absorber while maintaining a long and useful life of the thermometer.

According to the invention there is provided a thermo-control arrangement for an electric circuit comprising a relay adapted to control the current in said circuit (e. g. to make and break the circuit), a thermostat located in a position where it is responsive to changes of temperature in or associated with said circuit, relay circuits to operate the relay, the first including the thermostat contacts, a switch in the first relay circuit and means for closing said switch at timed intervals for a brief period, the second relay circuit comprising two switches, the first being adapted to be closed and to be opened only during a part of said brief period and means to open and again close said switch at the appropriate time, the second being adapted to be closed by current flowing in the relay coil. The term "brief period" means in practice an almost instantaneous switching in and out of the thermostat for example, the time may be of the order of $\frac{1}{50}$ second, switching occurring at intervals of say 10 seconds. The criterion of briefness is such an interval of time as will allow the relay to operate but sufficiently short to give a long economic life to the thermostat, for, as will appear later, the shorter the period the less likelihood there is of arcing occurring.

The first and second switches may be operated to make and break the relay circuit by means of any suitable form of timing device such for instance as a uniformly moving cam-shaft or by any known form of electrical timing device.

One way of carrying the invention into effect will be described with reference to its application to an automatic cigarette packing machine in which the adhesive on the packet seams is dried by electric heaters. Part of such a machine is illustrated and described in United States patent application Serial No. 677,228 and as described therein the packets are delivered into pockets in an intermittently rotating wheel and electric heaters surrounding the wheel dry the adhesive. At times the wheel may cease to move because the machine is stopped and if the wheel is loaded with packets they may become overheated if there is no thermo-control. Again, if the wheel is empty and there are no packets to absorb the heat the temperature may rise high enough to injure the first packets passing into the wheel. As the wheel moves intermittently at high speed there is some vibration and a bimetallic strip (which would have to be of considerable length to suit the particular requirements) is liable to vibrate and disturb the accuracy of the switching and a mercury contact thermometer is used as the thermostat. This is fitted to the machine at a suitable position near the heaters.

The invention will be more fully described with reference to the accompanying drawings in which—

Figure 1:
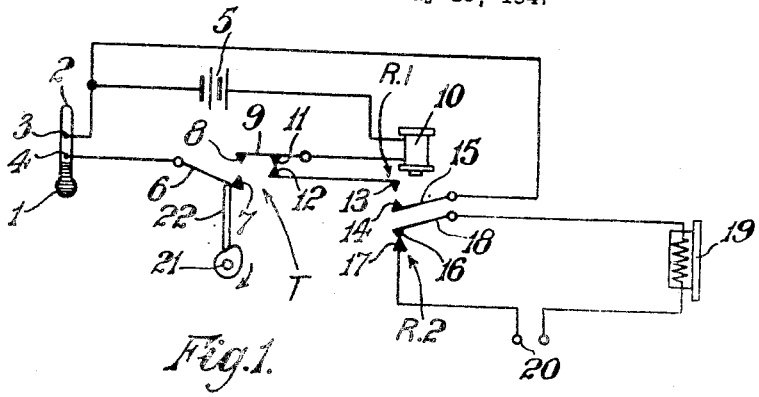
Figure 1 is a diagram illustrating the invention.

Referring to the drawings:

The thermometer consists of a bulb 1 and a tube 2 with several platinum contacts such as 3 and 4 sealed in the tube and disposed at various heights in the tube to give several possible temperature ranges according to which pair of contacts is connected to the circuit. The mercury is deliberately shown low in the tube so that the thermometer contacts can be seen. The upper thermometer contact 3 is connected to one lead, e. g. the negative, of a low-voltage circuit, the voltage being provided by a battery 5, for instance at a pressure of two volts. The thermometer contact 4 is connected to a pivoted arm 6 having a contact 7 which is operated periodically by movements of the arm 6 as described later to cooperate with a contact 8, thus forming a switch.

The contact 8 is on a pivoted arm 9 from which a line leads to one end of the coil 10 of a relay. The relay consists of the coil and two movable arms 15 and 18 each having a contact, 14 and 16 respectively, adapted to engage with other contacts, 13 and 17 respectively, thus constituting two separate switches described and referred to later as the first and second relay contact switches. From the other end of said relay coil a line leads to the other pole of the battery, e. g. the positive side. Another contact 11 joined to the second contact 8 (i. e. carried on the arm 9) is provided which is periodically connected to a further contact 12 by movements of the arm 9, the contacts 11 and 12 thus forming a further switch. From the contact 12 a line leads to the contact 13 of the first relay contact switch. From the arm 15 a line leads to the negative side of the battery. Since the whole switch device comprising the four contacts 7—8 and 11—12 is operated periodically it will be, for convenience, referred to comprehensively as the "timing" switch, T, while the said first relay contact switch (i. e. the contact 13—14) will be indicated generally by the reference R. 1.

The contacts 16 and 17 switch the main current for the machine heaters on and off and constitute a second relay contact switch and bear the general reference R. 2. A line leads from the arm 18 to the heater 19 of the machine and thence to one terminal of the main supply 20. The other terminal of 20 is connected to the contact 17.

As the timing switch T is operated, the first switch 7—8 closes and shortly afterward the second switch 11—12 opens. Then a moment later the second switch 11—12 closes and after a further short interval the first switch 7—8 opens. These events take place at regular intervals though neither the time of the interval nor precise regularity are of great importance and the switch movements may be effected by a cam 21 and rod 22.

As above explained the timing switch is operated periodically and the movements are such that during a time interval of 1/50 second in a cycle of 10 seconds the switch 7—8 closes, then the switch 11—12 opens, next the switch 11—12 closes and finally the switch 7—8 opens. Thus if the upper contact of the thermostat is in contact with the mercury (i. e. the temperature is high) the relay coil 10 is energized when the switch 7—8 closes. Thereupon the first relay contact switch R. 1 is closed and the main current or second relay contact switch R. 2 is opened and the heater 19 is switched off.

Next the switch 11—12 opens. Then it closes and holds the current in relay coil 10, whereupon the switch 7—8 opens but the relay coil current is still held by the locking circuit provided by the relay contact switch R. 1, which circuit does not include the thermostat until the end of the cycle when once again control passes to the thermostat, that is the relay coil circuit will again include the thermostat.

On the next cam rod stroke, that is, at the next cycle, supposing the temperature is still high, nothing further happens, for the closing of switch 7—8 maintains the relay coil circuit during the time that switch 11—12 opens and when the latter closes and 7—8 opens, the relay coil remains energized through switches 11—12 and 13—14.

As the mercury column falls in response to a fall in temperature of the heated parts of the machine the upper contact 3 of the thermostat will eventually become exposed as the mercury falls and if the current is on, an arc will occur between the mercury and said contact 3 which will break in time when the length is too great for the arc to persist. Arcing also occurs as the column rises toward a contact. This arcing causes the contacts to corrode and the products of combustion of combination between the mercury and the platinum contacts dim the tube of the thermometer and obscure visual reading. The present invention reduces the chances of arcing occurring since the time interval when the thermostat is in circuit is very small indeed and it is only rarely that the mercury is approaching or receding from the upper contact in such manner that arcing can occur at the instant the voltage is applied to the thermostat.

Supposing then that the temperature has fallen before the beginning of the next cycle sufficiently to expose the upper thermometer contact 3, the closing of the switch 7—8 will have no result as the corresponding circuit through the relay is broken in the thermostat. When, however, the continued movement of arm 6 opens switch 11—12 the existing relay coil circuit, which is holding arms 15 and 18 up, is broken and they drop. The heater 19 is therefore switched on while the relay coil remains dead until the next cycle when events will occur as noted above according to whether the thermometer contact 3 is in or out of the mercury.

It will be seen then that the thermostat may be in circuit for a very small proportion of the time the machine is working and it is only on very rare occasions that the mercury would rise to or sink below a contact at the precise instant that the current is on, so arcing may be said to be nonexistent for all practical purposes.

In a specific case the time allowed for the first switch 7—8 to close is 3 milli-seconds though it can be shorter. The second switch 11—12 then opens and stays open for a further 14 milli-seconds. This period is sufficient to allow the relay to operate (i. e. for the arms 15 and 18 to move away from the coil) in the case where temperature has fallen low enough for the mercury to be below the thermostat contact 3, when it is necessary for the relay coil 10 to be switched off so that the main current contacts of the relay contact switch R. 2 will be closed and the heaters switched on. At the end of the second time period the switch 11—12 closes and in a further 3 milli-seconds period, which may however be shorter, the first switch 7—8 opens. The switch 11—12 remains closed until the start of the next cycle, and then opens again as the second operation in said cycle. The total of the three periods mentioned need not exceed 1/50 second which is sufficient to ensure that the relay will operate if a current passes. The position of the first relay contact switch R. 1 at the beginning of a cycle may be closed or open according to the events of the previous cycle but if it is closed (when the second relay contact switch R. 2 will be open and the heaters off) and mercury is high it will stay closed. If the mercury is low the switch will open, since there will be no relay current as the switch 7—8 closes and the subsequent opening of the switch 11—12 breaks the only remaining current through the circuit. Conversely if the first relay contact switch R. 1 is open (heaters on) and the mercury is high the switch R. 1 will close as the switch 7—8 closes and the heaters will be switched off or if the mercury is low the closing of the switch 11—12 will have no effect and the heaters will stay on for a further cycle.

It will be seen then that the switching arrangements are such that the thermostat is withdrawn from the circuit for the bulk of the working period and thus there is no opportunity for an arc to start and be drawn out until it breaks by mere length.

The interval between the periods of contact operation for most efficient working should be less than the time taken by the mercury column to fall or rise between the desired upper and lower limits of temperature.

There are numerous ways in which the timing switch may be operated and the method chosen depends on the best available means.

A simple and obvious method for use on automatic machines is a camshaft geared to the machine and operating the switch contacts in the desired sequence and at the desired intervals. This is shown diagrammatically in Figure 1 where a cam 21 operates the arm 6 by a rod 22.

Figure 2:
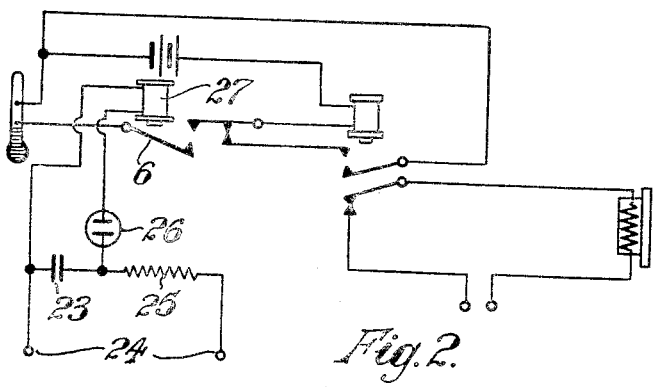
Figure 2 is similar to Figure 1 but shows a different method of operating the timing switch.

Another convenient method consists in the employment of a charging and discharging condenser device of any known kind. For instance, as shown in Figure 2, a condenser 23 may be connected across high tension direct current terminals 24 in series with a resistance 25 and a further device (e. g. a neon tube 26) is arranged in parallel with the condenser. When the condenser voltage builds up to a high enough value it discharges through the neon tube and then the voltage starts to build up again. The discharge through the neon tube can be used to energise a magnet 27 which operates the arm 6. About 300 volts across the terminals 24 is sufficient for satisfactory operation.

Figure 3:
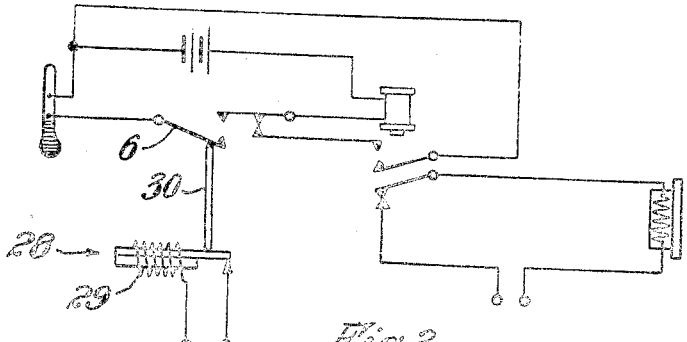
Figure 3 is similar to Figure 1 but shows a further method of operating the timing switch.

A thermal relay 28, Figure 3, may also be used to cut in and out as the coil 29 thereof is heated and cooled the movements being utilised to operate the arm 6 by a rod 30.

It will be understood that the invention may be used with other forms of thermostat where desired, for example a bimetallic strip.

The term "switch" includes any device for making and breaking an electric circuit.

What I claim as my invention and desire to secure by Letters Patent is:

1. In a thermostatically controlled relay system, the combination with a thermostatic switch, of a relay having a winding, an armature and a switch actuated by said armature to open and close a controlled circuit, said relay winding, and a normally open switch being arranged in series in a relay energizing circuit, said winding, a normally closed switch, and a switch operable to closed position by actuation of said armature on energization of said winding, being arranged in series in a relay holding circuit, and timing means intermittently operable independently of the position of said thermostatic switch to effect closing of said normally open switch for a brief period only, as compared to the operating period of said thermostatic switch, and to effect opening of said normally closed switch, but only during said brief period, whereby said relay is energized from said relay energizing circuit only during a period of conjoint closure of said thermostatic and normally open switches, and is thereafter energized by said relay holding circuit until released by conjoint opening of said thermostatic and normally closed switches, said periods of conjoint closure and conjoint opening, combined, constituting a small fraction of the total time of a cycle of said timing means, whereby closing and opening of said thermostatic switch normally occurs while said thermostatic switch is out of circuit and arcing of the thermostatic switch contacts is thereby prevented.

2. A system as claimed in claim 1 including devices mechanically coupling said normally open and said normally closed switches to effect operation thereof in sequence, said timing means being connected to said normally open switch to close the latter and thereby, through said coupling devices, to open said normally closed switch.

3. A system as claimed in claim 1 wherein said timing means is constituted by cam mechanism driven at a predetermined rate.

4. A system as claimed in claim 1 wherein said timing means is constituted by electrically actuated mechanism including a discharging condenser.

5. A system as claimed in claim 1 wherein said timing means is constituted by a thermal relay device.

EDWARD ANTHONY CHANDLER.

REFERENCES CITED

The following references are of record in the file of this patent:

UNITED STATES PATENTS

| Number | Name | Date |
|---|---|---|
| 2,347,514 | Shively et al. | Apr. 25, 1944 |
| 2,363,433 | Olson | Nov. 21, 1944 |
| 2,435,027 | Blomberg | Jan. 27, 1948 |
| 2,463,469 | Schirokauer | Mar. 1, 1949 |

FOREIGN PATENTS

| Number | Country | Date |
|---|---|---|
| 67,855 | Sweden | Apr. 21, 1928 |